United States Patent
Kondo

(10) Patent No.: US 10,698,182 B2
(45) Date of Patent: Jun. 30, 2020

(54) IMAGING LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 138 days.

(21) Appl. No.: 16/111,611

(22) Filed: Aug. 24, 2018

(65) Prior Publication Data

US 2019/0064487 A1    Feb. 28, 2019

(30) Foreign Application Priority Data

Aug. 31, 2017 (JP) .................................. 2017-166910

(51) Int. Cl.
| | |
|---|---|
| G02B 9/34 | (2006.01) |
| G02B 13/18 | (2006.01) |
| G02B 13/00 | (2006.01) |
| G02B 9/64 | (2006.01) |
| G02B 27/00 | (2006.01) |
| G02B 13/16 | (2006.01) |

(52) U.S. Cl.
CPC ........... G02B 13/0045 (2013.01); G02B 9/64 (2013.01); G02B 13/006 (2013.01); G02B 13/16 (2013.01); G02B 13/18 (2013.01); G02B 27/005 (2013.01)

(58) Field of Classification Search
CPC .... G02B 13/0045; G02B 9/64; G02B 13/006; G02B 13/16; G02B 13/18; G02B 27/005

USPC .......................... 359/715, 753, 771, 772, 774
See application file for complete search history.

(56) References Cited

U.S. PATENT DOCUMENTS

| | | |
|---|---|---|
| 2012/0257100 A1 | 10/2012 | Imaoka et al. |
| 2013/0033768 A1 | 2/2013 | Sunaga et al. |
| 2013/0235251 A1* | 9/2013 | Kanai .................. G02B 15/177 348/345 |

FOREIGN PATENT DOCUMENTS

| | | |
|---|---|---|
| JP | 2012-226309 A | 11/2012 |
| JP | 2013-037080 A | 2/2013 |

* cited by examiner

*Primary Examiner* — William Choi
(74) *Attorney, Agent, or Firm* — Studebaker & Brackett PC

(57) ABSTRACT

The imaging lens consists of, in order from an object side: a first lens group that has a positive refractive power; a stop; a second lens group that has a refractive power; a third lens group that has a negative refractive power; and a fourth lens group that has a positive refractive power. The first lens group has, successively in order from a position closest to the object side, a negative meniscus lens that is convex toward the object side, a lens that is convex toward the object side, and a lens that is concave toward the object side. The third lens group consists of a negative lens. During focusing from an object at infinity to an object at a shortest distance, only the third lens group moves to an image side along an optical axis. The imaging lens satisfies a predetermined conditional expression relating to a focal length of the first lens group and a radius of curvature of an image side surface of a lens closest to the image side in the first lens group.

20 Claims, 8 Drawing Sheets

EXAMPLE 1

EXAMPLE 1

EXAMPLE 2

EXAMPLE 3

EXAMPLE 4

EXAMPLE 5

EXAMPLE 6

EXAMPLE 1

EXAMPLE 2

EXAMPLE 3

EXAMPLE 4

EXAMPLE 5

EXAMPLE 6

IMAGING LENS AND IMAGING APPARATUS

CROSS REFERENCE TO RELATED APPLICATIONS

The present application claims priority under 35 U.S.C. § 119 to Japanese Patent Application No. 2017-166910 filed on Aug. 31, 2017. The above application is hereby expressly incorporated by reference, in its entirety, into the present application.

BACKGROUND OF THE INVENTION

1. Field of the Invention

The present invention relates to an imaging lens, which is particularly suitable for imaging apparatuses such as a digital camera, a lens interchangeable type digital camera, and a movie imaging camera, and an imaging apparatus comprising the imaging lens.

2. Description of the Related Art

In imaging lenses used for imaging apparatuses such as a digital camera, a lens interchangeable type digital camera, and a movie imaging camera, an inner focus type imaging lens which is advantageous for small size and high speed focusing has been proposed (refer to, for example, JP2012-226309A and JP2013-37080A).

SUMMARY OF THE INVENTION

JP2012-226309A and JP2013-37080A each disclose an imaging lens which is advantageous for high speed focusing and in which the focus lens group is composed of only one lens.

However, as a wide angle type imaging lens, the imaging lens of each of Examples 1 and 2 of JP2012-226309A does not have a sufficient angle of view. As wide angle type imaging lenses, the imaging lens of each of Examples 3 and 4 of JP2012-226309A has a sufficient angle of view, but the total optical length is large and the lens system is not sufficiently miniaturized.

Although the imaging lens described in JP2013-37080A has a small size, it is difficult to ensure a sufficient angle of view while suppressing various aberrations in view of the structure.

The present invention has been made in consideration of the above-mentioned situations, and it is an object of the present invention to provide an inner focus type imaging lens having a small size and a wide angle of view and an imaging apparatus comprising the imaging lens.

An imaging lens of the present invention consists of, in order from an object side: a first lens group that has a positive refractive power; a stop; a second lens group that has a refractive power; a third lens group that has a negative refractive power; and a fourth lens group that has a positive refractive power. The first lens group has, successively in order from a position closest to the object side, a negative meniscus lens that is convex toward the object side, a lens that is convex toward the object side, and a lens that is concave toward the object side. The third lens group consists of a negative lens. During focusing from an object at infinity to an object at a shortest distance, only the third lens group moves to an image side along an optical axis. Assuming that a focal length of the first lens group is f1 and a radius of curvature of an image side surface of a lens closest to the image side in the first lens group is Ra1, Conditional Expression (1) is satisfied.

$$-9 < f1/Ra1 < -0.2 \quad (1)$$

It is preferable to satisfy Conditional Expression (1-1).

$$-5 < f1/Ra1 < -0.5 \quad (1\text{-}1)$$

In the imaging lens of the present invention, assuming that a distance on the optical axis from an object side surface of a lens closest to the object side in the first lens group to the stop is GS1 and a distance from the stop to an image side surface of a lens closest to the image side in the second lens group is GS2, it is preferable to satisfy the Conditional Expression (2), and it is more preferable to satisfy the Conditional Expression (2-1).

$$0.8 < GS1/GS2 < 2.1 \quad (2)$$

$$1 < GS1/GS2 < 1.9 \quad (2\text{-}1)$$

It is preferable that the first lens group has a cemented lens which is formed by cementing a negative lens and a positive lens in order from the object side.

It is preferable that the second lens group has a lens that is concave toward the object side, at a position closest to the object side.

It is preferable that the second lens group has a cemented lens which is formed by cementing at least one negative lens and at least one positive lens.

Assuming that a focal length of the whole system during focusing on the object at infinity is f and a focal length of the fourth lens group is f4, it is preferable to satisfy the Conditional Expression (3).

$$0.05 < f/f4 < 0.7 \quad (3)$$

It is preferable that the second lens group has a cemented lens which is formed by cementing at least one negative lens and at least one positive lens. Assuming that a difference in Abbe number between a maximum of Abbe numbers of positive lenses composing the cemented lens and a minimum of Abbe numbers of negative lenses composing the cemented lens is vdiff2, it is preferable to satisfy the Conditional Expression (4). In the second lens group, in a case where there is a plurality of cemented lenses each of which is formed by cementing at least one positive lens and at least one negative lens, at least one cemented lens satisfying Conditional Expression (4) may be necessary.

$$10 < \text{vdiff2} \quad (4)$$

Assuming that a focal length of the second lens group is f2, and a radius of curvature of an image side surface of a lens closest to the image side in the second lens group is Ra2, it is preferable to satisfy the Conditional Expression (5), and it is more preferable to satisfy the Conditional Expression (5-1).

$$-4 < f2/Ra2 < -0.5 \quad (5)$$

$$-2.5 < f2/Ra2 < -0.8 \quad (5\text{-}1)$$

Assuming that a focal length of the whole system during focusing on the object at infinity is f and the focal length of the first lens group is f1, it is preferable to satisfy the Conditional Expression (6), and it is more preferable to satisfy the Conditional Expression (6-1).

$$0.05 < f/f1 < 0.7 \quad (6)$$

$$0.1 < f/f1 < 0.6 \quad (6\text{-}1)$$

Assuming that a focal length of the whole system during focusing on the object at infinity is f, and a focal length of the third lens group is f3, it is preferable to satisfy the Conditional Expression (7), and it is more preferable to satisfy the Conditional Expression (7-1).

$$-1.5<f/f3<-0.1 \qquad (7)$$

$$-1.3<f/f3<-0.2 \qquad (7\text{-}1)$$

Assuming that a focal length of the whole system during focusing on the object at infinity is f and a composite focal length of the first lens group and the second lens group is f12, it is preferable to satisfy the Conditional Expression (8).

$$1<f/f12<2.5 \qquad (8)$$

It is preferable that the second lens group has, in order from the object side, an aspheric lens, and a three-piece cemented lens which is formed by cementing three lenses, and the three-piece cemented lens consists of two positive lenses and one negative lens.

It is preferable that the fourth lens group consists of a positive lens.

Assuming that a back focal length based on an air conversion length is Bf and a focal length of the whole system during focusing on the object at infinity is f, it is preferable to satisfy the Conditional Expression (9).

$$0.5<Bf/f<1.1 \qquad (9)$$

An imaging apparatus of the present invention comprises the above-mentioned imaging lens of the present invention.

It should be noted that the term "consists of ~" means that the imaging lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, the refractive index and the Abbe number in each conditional expression are based on the d line as the reference wavelength.

Further, surface shapes, signs of refractive powers, radii of curvature of the lenses are assumed as those in paraxial regions in a case where some lenses have aspheric surfaces.

The imaging lens of the present invention consists of, in order from an object side: a first lens group that has a positive refractive power; a stop; a second lens group that has a refractive power; a third lens group that has a negative refractive power; and a fourth lens group that has a positive refractive power. The first lens group has, successively in order from a position closest to the object side, a negative meniscus lens that is convex toward the object side, a lens that is convex toward the object side, and a lens that is concave toward the object side. The third lens group consists of a negative lens. During focusing from the object at infinity to the object at a shortest distance, only the third lens group moves to the image side along the optical axis. The imaging lens satisfies the predetermined conditional expression relating to the focal length of the first lens group and the radius of curvature of the image side surface of the lens closest to the image side in the first lens group. Therefore, it is possible to provide an imaging lens having a small size and a wide angle of view, and an imaging apparatus comprising the imaging lens.

DESCRIPTION OF THE PREFERRED EMBODIMENTS

Figure 1:
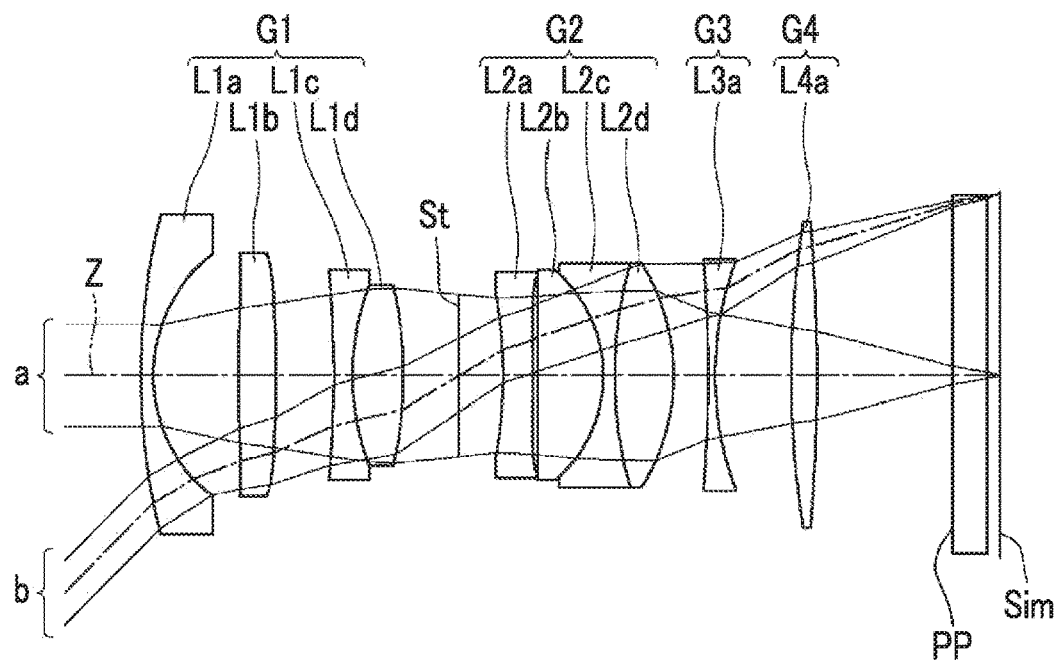
FIG. 1 is a cross-sectional view illustrating a lens configuration of an imaging lens (common to Example 1) according to an embodiment of the present invention.

Hereinafter, an embodiment of the present invention will be described with reference to drawings. FIG. 1 is a cross-sectional view illustrating a lens configuration of an imaging lens according to an embodiment of the present invention. The exemplary configuration shown in FIG. 1 is the same as the configuration of the imaging lens of Example 1 to be described later. In FIG. 1, the left side is an object side, and the right side is an image side. In addition, an aperture stop St shown in the drawing does not necessarily show its real size and shape, but show a position on an optical axis Z. FIG. 1 shows a state where the object at infinity is in focus, and additionally shows on-axis rays a and rays with the maximum angle of view b.

In order to mount the imaging lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The imaging lens of the present embodiment consists of, in order from the object side: a first lens group G1 that has a positive refractive power; an aperture stop St; a second lens group G2 that has a refractive power; a third lens group G3 that has a negative refractive power; and a fourth lens group G4 that has a positive refractive power. The first lens group G1 has, successively in order from a position closest to the object side, a negative meniscus lens that is convex toward the object side, a lens that is convex toward the object side, and a lens that is concave toward the object side. The third lens group G3 consists of a negative lens L3a. During focusing from the object at infinity to the object at a shortest distance, only the third lens group G3 moves to the image side along the optical axis Z.

By providing the first lens group G1 with a positive refractive power, it is possible to minimize the height of the on-axis rays and to minimize the size of the aperture stop St and the diameter of the second lens group G2. Further, in the first lens group G1, successively in order from a position closest to the object side, a negative meniscus lens that is convex toward the object side, a lens that is convex toward the object side, and a lens that is concave toward the object side are provided. Thereby, it is possible to ensure the angle of view while correcting distortion and astigmatism.

By disposing the aperture stop St between the first lens group G1 and the second lens group G2, the symmetry of the optical system with respect to the aperture stop St is improved. There is an advantage in particularly correcting lateral chromatic aberration.

Since the third lens group G3 as the focusing group is composed of only the negative lens L3a, the weight of the focusing group can be reduced, which contributes to increasing the speed of the autofocus. Further, by adopting a configuration in which only the third lens group G3 moves to the image side along the optical axis Z during focusing from the object at infinity to the object at the shortest distance, the negative refractive power of the third lens group G3 is minimized. As a result, it is possible to suppress occurrence of various aberrations, and it is possible to minimize the diameter of the third lens group G3.

By providing the fourth lens group G4 with a positive refractive power, it is possible to minimize the angle of incidence of rays to the image plane Sim.

Assuming that a focal length of the first lens group G1 is f1 and a radius of curvature of an image side surface of a lens closest to the image side in the first lens group G1 is Ra1, the imaging lens is configured to satisfy Conditional Expression (1). By not allowing the result of Conditional Expression (1) to be equal to or less than the lower limit, there is an advantage in correcting spherical aberration. By not allowing the result of Conditional Expression (1) to be equal to or greater than the upper limit, there is an advantage in ensuring the angle of view while achieving reduction in total optical length. In addition, in a case where Conditional Expression (1-1) is satisfied, it is possible to obtain more favorable characteristics.

$$-9 < f1/Ra1 < -0.2 \tag{1}$$

$$-5 < f1/Ra1 < -0.5 \tag{1-1}$$

In the imaging lens of the present embodiment, assuming that a distance on the optical axis Z from an object side surface of a lens closest to the object side in the first lens group G1 to the aperture stop St is GS1, and a distance from the aperture stop St to an image side surface of a lens closest to the image side in the second lens group G2 is GS2, it is preferable to satisfy the Conditional Expression (2). By not allowing the result of Conditional Expression (2) to be equal to or less than the lower limit, there is an advantage in ensuring the angle of view while suppressing various aberrations. By not allowing the result of Conditional Expression (2) to be equal to or greater than the upper limit, there is an advantage in achieving reduction in total optical length. In addition, in a case where Conditional Expression (2-1) is satisfied, it is possible to obtain more favorable characteristics.

$$0.8 < GS1/GS2 < 2.1 \tag{2}$$

$$1 < GS1/GS2 < 1.9 \tag{2-1}$$

It is preferable that the first lens group G1 has a cemented lens which is formed by cementing a negative lens and a positive lens in order from the object side. With such a configuration, there is an advantage in correcting longitudinal chromatic aberration and lateral chromatic aberration.

It is preferable that the second lens group G2 has a lens that is concave toward the object side, at a position closest to the object side. With such a configuration, occurrence of astigmatism is suppressed, and there is an advantage in ensuring the angle of view.

It is preferable that the second lens group G2 has a cemented lens which is formed by cementing at least one negative lens and at least one positive lens. With such a configuration, there is an advantage in correcting longitudinal chromatic aberration and lateral chromatic aberration.

Assuming that a focal length of the whole system during focusing on the object at infinity is f and a focal length of the fourth lens group G4 is f4, it is preferable to satisfy the Conditional Expression (3). By not allowing the result of Conditional Expression (3) to be equal to or less than the lower limit, there is an advantage in minimizing the angle of incidence of rays to the image plane Sim. By not allowing the result of Conditional Expression (3) to be equal to or greater than the upper limit, Petzval sum can be suppressed, and thus there is an advantage in suppressing field curvature. In addition, in a case where Conditional Expression (3-1) is satisfied, it is possible to obtain more favorable characteristics.

$$0.05 < f/f4 < 0.7 \tag{3}$$

$$0.07 < f/f4 < 0.6 \tag{3-1}$$

It is preferable that the second lens group G2 has a cemented lens which is formed by cementing at least one negative lens and at least one positive lens. Assuming that a difference in Abbe number between a maximum of Abbe numbers of positive lenses composing the cemented lens and a minimum of Abbe numbers of negative lenses composing the cemented lens is vdiff2, it is preferable to satisfy the Conditional Expression (4). By not allowing the result of Conditional Expression (4) to be equal to or less than the lower limit, it is possible to prevent longitudinal chromatic aberration and lateral chromatic aberration from being insufficiently corrected. As a result, it is possible to perform appropriate correction. In addition, in a case where Conditional Expression (4-1) is satisfied, it is possible to obtain more favorable characteristics. By not allowing the result of Conditional Expression (4-1) to be equal to or greater than the upper limit, it is possible to prevent longitudinal chromatic aberration and lateral chromatic aberration from being excessively corrected. As a result, it is possible to perform appropriate correction.

$$10<vdiff2 \tag{4}$$

$$10<vdiff2<50 \tag{4-1}$$

Assuming that a focal length of the second lens group G2 is f2, and a radius of curvature of an image side surface of a lens closest to the image side in the second lens group G2 is Ra2, it is preferable to satisfy the Conditional Expression (5). By not allowing the result of Conditional Expression (5) to be equal to or less than the lower limit, it is possible to prevent correction of spherical aberration from becoming excessively insufficient. By not allowing the result of Conditional Expression (5) to be equal to or greater than the upper limit, it is possible to prevent overcorrection of spherical aberration from becoming excessive. In addition, in a case where Conditional Expression (5-1) is satisfied, it is possible to obtain more favorable characteristics.

$$-4<f2/Ra2<-0.5 \tag{5}$$

$$-2.5<f2/Ra2<-0.8 \tag{5-1}$$

Assuming that a focal length of the whole system during focusing on the object at infinity is f and the focal length of the first lens group G1 is f1, it is preferable to satisfy the Conditional Expression (6). By not allowing the result of Conditional Expression (6) to be equal to or less than the lower limit, the height of on-axis rays is minimized. As a result, there is an advantage in minimizing the diameters of the aperture stop St and the second lens group G2. By not allowing the result of Conditional Expression (6) to be equal to or greater than the upper limit, there is an advantage in suppressing spherical aberration and astigmatism. In addition, in a case where Conditional Expression (6-1) is satisfied, it is possible to obtain more favorable characteristics.

$$0.05<f/f1<0.7 \tag{6}$$

$$0.1<f/f1<0.6 \tag{6-1}$$

Assuming that a focal length of the whole system during focusing on the object at infinity is f and a focal length of the third lens group G3 is f3, it is preferable to satisfy the Conditional Expression (7). By not allowing the result of Conditional Expression (7) to be equal to or less than the lower limit, the amount of movement of the third lens group G3 during focusing is prevented from becoming excessively large. As a result, there is an advantage in increasing the speed of the autofocus. Further, there is also an advantage in ensuring a space for arranging the mechanical parts on the image side of the second lens group G2 and on the object side of the fourth lens group G4. By not allowing the result of Conditional Expression (7) to be equal to or greater than the upper limit, the refractive power of the third lens group G3 can be prevented from becoming excessively strong. Thus, it is possible to suppress fluctuation in spherical aberration, astigmatism, and chromatic aberration during focusing, and it is possible to obtain favorable optical performance on the proximity side. In addition, in a case where Conditional Expression (7-1) is satisfied, it is possible to obtain more favorable characteristics.

$$-1.5<f/f3<-0.1 \tag{7}$$

$$-1.3<f/f3<-0.2 \tag{7-1}$$

Assuming that a focal length of the whole system during focusing on the object at infinity is f and a composite focal length of the first lens group G1 and the second lens group G2 is f12, it is preferable to satisfy the Conditional Expression (8). By not allowing the result of Conditional Expression (8) to be equal to or less than the lower limit, positive refractive powers of the first lens group G1 and the second lens group G2 can be prevented from becoming excessively weak. Thus, it is possible to minimize the total optical length. By not allowing the result of Conditional Expression (8) to be equal to or greater than the upper limit, the positive refractive powers of the first lens group G1 and the second lens group G2 can be prevented from becoming excessively strong. Thus, there is an advantage in suppressing spherical aberration and astigmatism. In addition, in a case where Conditional Expression (8-1) is satisfied, it is possible to obtain more favorable characteristics.

$$1<f/f12<2.5 \tag{8}$$

$$1.2<f/f12<2.1 \tag{8-1}$$

It is preferable that the second lens group G2 has, in order from the object side, an aspheric lens, and a three-piece cemented lens which is formed by cementing three lenses, and the three-piece cemented lens consists of two positive lenses and one negative lens. With such a configuration, there is an advantage in correcting longitudinal chromatic aberration and lateral chromatic aberration.

It is preferable that the fourth lens group G4 consists of a positive lens. Such a configuration contributes to achieving reduction in total lens length and reduction in weight of the lens system.

Assuming that a back focal length based on an air conversion length is Bf and a focal length of the whole system during focusing on the object at infinity is f, it is preferable to satisfy the Conditional Expression (9). By not allowing the result of Conditional Expression (9) to be equal to or less than the lower limit, it is possible to obtain a sufficient back focal length necessary for an interchangeable lens. By not allowing the result of Conditional Expression (9) to be equal to or greater than the upper limit, there is an advantage in achieving reduction in total lens length.

$$0.5<Bf/f<1.1 \tag{9}$$

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the imaging lens of the present invention will be described. First, the imaging lens of Example 1 will be described. FIG. 1 is a cross-sectional view illustrating a lens configuration of the imaging lens of Example 1. In FIG. 1 and FIGS. 2 to 8 corresponding to Examples 2 to 8 to be described later, left sides thereof are the object side, and right sides thereof are the image side. In addition, the aperture stop St shown in the drawings does not necessarily indicate its size or shape, and indicates a position thereof on the optical axis Z. Further, FIGS. 1 to 8 show states where the object at infinity is in focus. Further, only in FIG. 1, on-axis rays a and rays with a maximum angle of view b are also shown together.

The imaging lens of Example 1 is composed of, in order from the object side, a first lens group G1 composed of four lenses of lenses L1a to L1d, an aperture stop St, a second lens group G2 composed of four lenses L2a to L2d, a third lens group G3 composed of only one lens L3a, and a fourth lens group G4 composed of only one lens L4a.

Table 1 shows basic lens data of the imaging lens of Example 1, Table 2 shows data about specification, and Table 3 shows data about aspheric surface coefficients. Hereinafter, meanings of the reference signs in the tables are, for example, as described in Example 1, and are basically the same as those in Examples 2 to 8.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)).

In addition, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted.

In the data about the specification of Table 2, values of the focal length f, the back focal length Bf, the F number FNo., and the total angle of view 2ω (°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 3 shows the surface numbers of the aspheric surfaces and aspheric surface coefficients of the aspheric surfaces. The "E±n" (n: an integer) in numerical values of the aspheric surface coefficients of Table 3 indicates "×10$^{±n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and Σ at the aspheric surface depth Zd means a sum with respect to m.

In the basic lens data, the data about specification, and the data about variable surface distances, a degree is used as a unit of an angle, and mm (millimeters) is used as a unit of a length, but appropriate different units may be used since the optical system can be used even in a case where the system is enlarged or reduced in proportion.

TABLE 1

Example 1·Lens Data (n and ν are based on d line)

| Surface Number | Radius of Curvature | Surface Distance | n | ν |
|---|---|---|---|---|
| 1 | 49.99907 | 1.000 | 1.67877 | 60.17 |
| 2 | 11.49414 | 6.999 | | |
| *3 | 333.42241 | 3.000 | 1.51680 | 64.20 |
| *4 | −85.68371 | 4.700 | | |
| 5 | −82.57288 | 1.510 | 1.64769 | 33.79 |
| 6 | 18.57497 | 4.155 | 1.88300 | 39.22 |
| 7 | −30.43151 | 4.514 | | |
| 8 (stop) | ∞ | 3.615 | | |
| *9 | −25.22876 | 2.400 | 1.90270 | 31.00 |
| *10 | −55.55537 | 0.324 | | |
| 11 | ∞ | 5.254 | 1.69680 | 55.53 |
| 12 | −10.52781 | 0.920 | 1.58144 | 40.75 |
| 13 | 29.72386 | 4.804 | 1.77250 | 49.60 |
| 14 | −15.99851 | 2.841 | | |
| 15 | −100.00002 | 0.540 | 1.74000 | 28.30 |
| 16 | 24.40620 | 6.180 | | |
| 17 | 72.32200 | 2.100 | 1.75500 | 52.32 |
| 18 | −132.74874 | 11.052 | | |
| 19 | ∞ | 2.850 | 1.51680 | 64.20 |
| 20 | ∞ | 1.001 | | |

TABLE 2

Example 1·Specification (d Line)

| | |
|---|---|
| f | 16.495 |
| Bf | 13.93 |
| FNo. | 2.08 |
| 2ω [°] | 91.2 |

TABLE 3

Example 1·Aspheric surface coefficient

| Surface Number | 3 | 4 | 9 | 10 |
|---|---|---|---|---|
| KA | 1.0000000E+00 | 1.0000000E+00 | 1.0000000E+00 | 1.0000000E+00 |
| A3 | 8.9845228E−04 | 0.0000000E+00 | 2.5097885E−05 | 3.5069803E−04 |
| A4 | −7.0632678E−04 | −2.5071534E−04 | 2.0139960E−04 | 9.7584326E−05 |
| A5 | 3.7162599E−04 | 6.4393016E−05 | −3.6576121E−05 | −1.4201324E−05 |
| A6 | −1.4109654E−04 | −3.0588465E−05 | 2.0427918E−05 | 4.4695466E−05 |
| A7 | 4.3586810E−05 | 5.3225907E−06 | −7.8228592E−07 | −1.0619361E−05 |
| A8 | −1.0722602E−05 | 3.3071162E−07 | −2.6821772E−06 | −2.6833438E−06 |
| A9 | 1.8668779E−06 | −2.6368534E−07 | 6.0706585E−07 | 1.2424808E−06 |
| A10 | −1.9572054E−07 | 2.8351776E−08 | 1.0153684E−07 | 5.7366241E−08 |
| A11 | 8.4643555E−09 | 2.7471827E−09 | −4.7535170E−08 | −7.6047373E−08 |
| A12 | 6.7371574E−11 | −8.3813180E−10 | −5.7018271E−10 | 2.8161896E−09 |
| A13 | 9.4300862E−11 | 3.5983009E−11 | 1.9311524E−09 | 2.6351185E−09 |
| A14 | −3.0563065E−11 | 7.4466144E−12 | −9.5624166E−11 | −2.0969545E−10 |
| A15 | 4.0239857E−12 | −8.6088430E−13 | −4.0934456E−11 | −5.2943813E−11 |

TABLE 3-continued

Example 1·Aspheric surface coefficient

| Surface Number | 3 | 4 | 9 | 10 |
|---|---|---|---|---|
| A16 | −3.1174946E−13 | −2.7974665E−15 | 2.2550141E−12 | 5.6081474E−12 |
| A17 | 1.4232554E−14 | 4.4168709E−15 | 4.6769733E−13 | 5.6341172E−13 |
| A18 | −2.9366171E−16 | −1.7606302E−16 | 4.9096846E−14 | −6.9224865E−14 |
| A19 |  |  | −1.9040656E−14 | −2.6085299E−15 |
| A20 |  |  | 1.1056897E−15 | 3.4742515E−16 |

Figure 9:
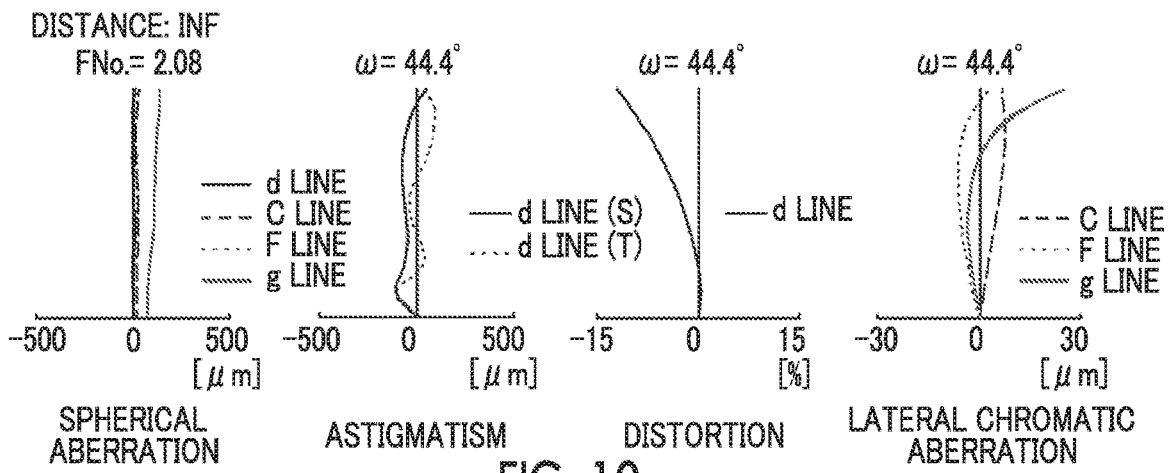
FIG. 9 is a diagram of aberrations of the imaging lens of Example 1 of the present invention.

FIG. 9 shows a diagram of aberrations of the imaging lens of Example 1. In addition, in order from the left side of FIG. 9, spherical aberration, astigmatism, distortion, and lateral chromatic aberration are shown. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm (nanometers)), the F line (a wavelength of 486.1 nm (nanometers)), and the g line (a wavelength of 435.8 nm (nanometers)) are respectively indicated by the long dashed line, the short dashed line, and the gray solid line. In addition, in the spherical aberration diagram, FNo. means an F number. In the other aberration diagrams, ω means a half angle of view.

Figure 2:
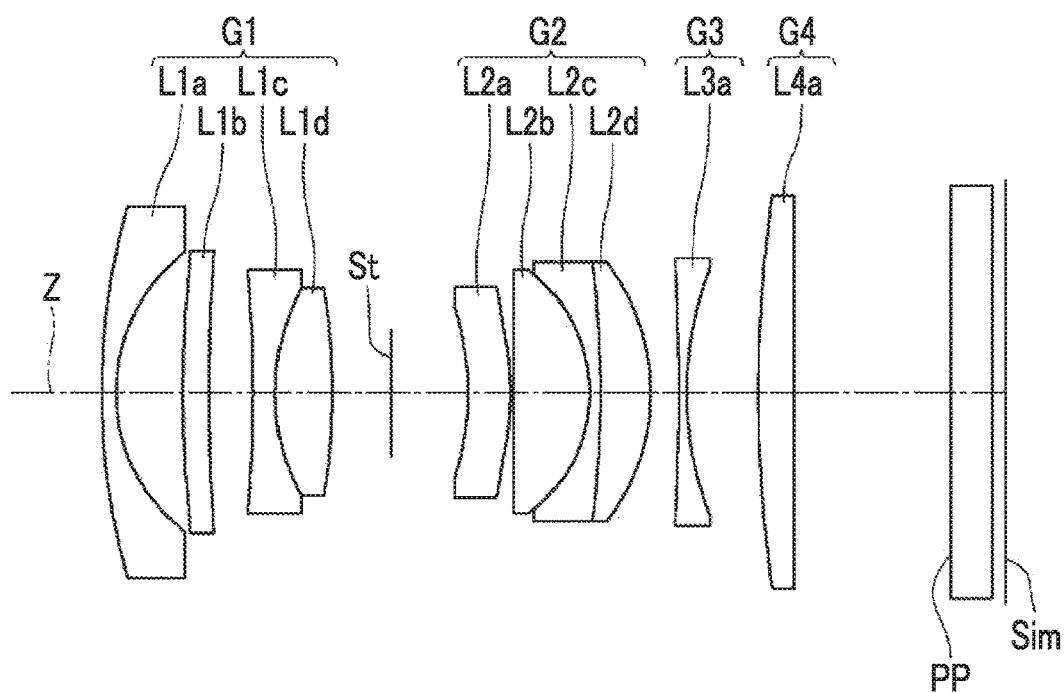
FIG. 2 is a cross-sectional view illustrating a lens configuration of an imaging lens of Example 2 of the present invention.
Figure 10:
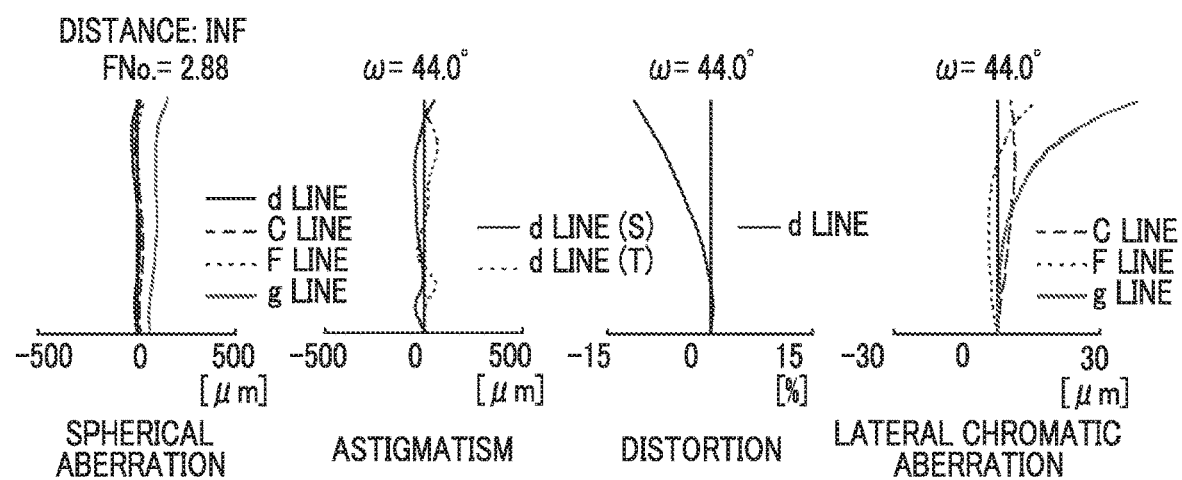
FIG. 10 is a diagram of aberrations of the imaging lens of Example 2 of the present invention.

Next, an imaging lens of Example 2 will be described. FIG. 2 is a cross-sectional view illustrating a lens configuration of the imaging lens of Example 2. The group configuration of the imaging lens of Example 2 is the same as the imaging lens of Example 1. Further, Table 4 shows basic lens data of the imaging lens of Example 2, Table 5 shows data about specification, and Table 6 shows data about aspheric surface coefficients. FIG. 10 shows aberration diagrams thereof.

TABLE 4

Example 2·Lens Data (n and ν are based on d line)

| Surface Number | Radius of Curvature | Surface Distance | n | ν |
|---|---|---|---|---|
| 1 | 43.78982 | 1.000 | 1.70055 | 59.12 |
| 2 | 11.49413 | 4.780 |  |  |
| *3 | 87.99133 | 1.800 | 1.51680 | 64.20 |
| *4 | 127.44784 | 3.100 |  |  |
| 5 | −83.33958 | 1.510 | 1.60916 | 34.71 |
| 6 | 14.18537 | 4.000 | 1.88300 | 39.22 |
| 7 | −40.84292 | 4.100 |  |  |
| 8 (Stop) | ∞ | 5.400 |  |  |
| *9 | −16.86724 | 2.980 | 1.84887 | 40.12 |
| *10 | −16.80647 | 0.200 |  |  |
| 11 | ∞ | 5.205 | 1.72273 | 55.36 |
| 12 | −10.12451 | 0.780 | 1.70000 | 30.00 |
| 13 | −66.25090 | 3.500 | 1.83481 | 42.74 |
| 14 | −13.90867 | 2.000 |  |  |
| 15 | −137.12463 | 0.540 | 1.69895 | 30.13 |
| 16 | 22.19462 | 5.000 |  |  |
| 17 | 87.86217 | 2.500 | 1.51680 | 64.20 |
| 18 | ∞ | 11.013 |  |  |
| 19 | ∞ | 2.850 | 1.51680 | 64.20 |
| 20 | ∞ | 1.002 |  |  |

TABLE 5

Example 2·Specification (d Line)

| f | 16.535 |
|---|---|
| Bf | 13.89 |
| FNo. | 2.88 |
| 2ω [°] | 88.0 |

TABLE 6

Example 2·Aspheric surface coefficient

| Surface Number | 3 | 4 | 9 | 10 |
|---|---|---|---|---|
| KA | 1.0000000E+00 | 1.0000000E+00 | 1.0000000E+00 | 1.0000000E+00 |
| A3 | 9.8871022E−04 | −2.3784826E−04 | 2.5097885E−05 | 3.5069803E−04 |
| A4 | −9.5551385E−04 | 3.4257084E−04 | 4.5549795E−05 | −3.9844793E−05 |
| A5 | 3.1248174E−04 | −3.4974885E−04 | −4.8449937E−05 | 8.7805952E−06 |
| A6 | 6.6829288E−05 | 2.1963713E−04 | 3.4250144E−05 | 4.0679517E−05 |
| A7 | −8.5537748E−05 | −8.0476123E−05 | −3.6988438E−06 | −1.0053255E−05 |
| A8 | 2.9274892E−05 | 1.6618873E−05 | −2.6334350E−06 | −2.6096402E−06 |
| A9 | −5.0003820E−06 | −1.4825940E−06 | 6.7543381E−07 | 1.2390054E−06 |
| A10 | 4.1505483E−07 | −9.2920800E−08 | 1.0648255E−07 | 5.5474886E−08 |
| A11 | −1.3105099E−08 | 3.6685658E−08 | −4.8339513E−08 | −7.5807701E−08 |
| A12 | 2.0750824E−09 | −4.4662120E−09 | −9.6627502E−10 | 2.8083332E−09 |
| A13 | −7.1716391E−10 | 6.2561634E−10 | 1.8960518E−09 | 2.6346605E−09 |
| A14 | 1.1257522E−10 | −9.9018811E−11 | −9.1660799E−11 | −2.1010527E−10 |
| A15 | −1.2463349E−11 | 7.4410520E−12 | −3.9885673E−11 | −5.3044610E−11 |
| A16 | 1.1077022E−12 | 2.0415040E−13 | 2.5145545E−12 | 5.6145882E−12 |
| A17 | −6.3812678E−14 | −6.8044841E−14 | 4.9531773E−13 | 5.6478238E−13 |

TABLE 6-continued

Example 2・Aspheric surface coefficient

| Surface Number | 3 | 4 | 9 | 10 |
|---|---|---|---|---|
| A18 | 1.6058146E−15 | 3.7346650E−15 | 5.3982902E−14 | −6.8444500E−14 |
| A19 | | −6.0110209E−17 | −2.4971403E−14 | −2.6133314E−15 |
| A20 | | | 1.6664748E−15 | 3.3329928E−16 |

Figure 3:
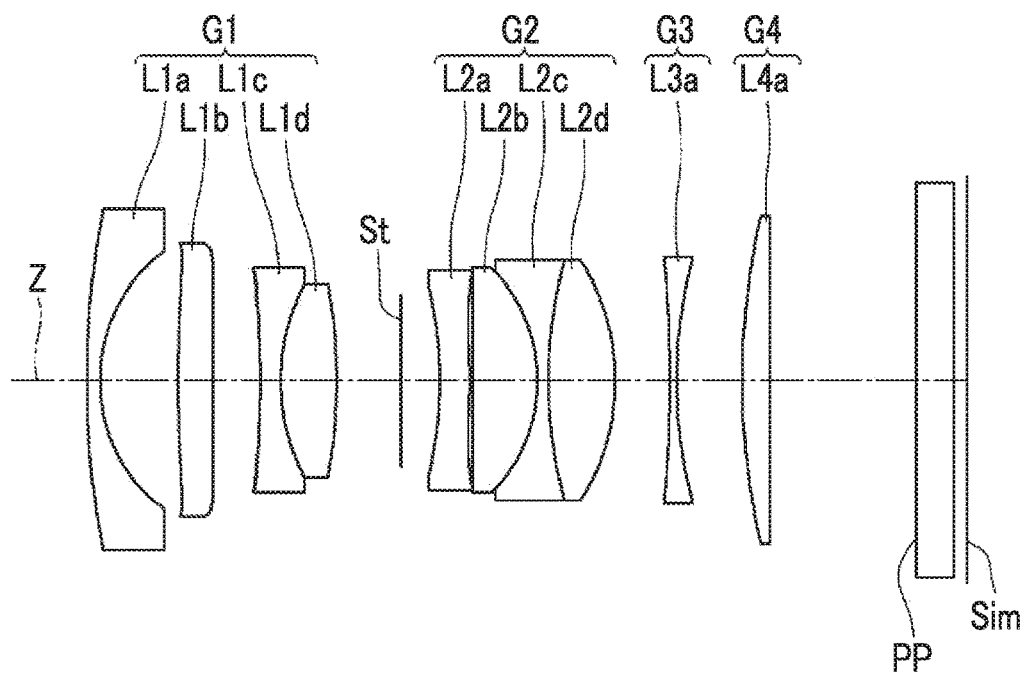
FIG. 3 is a cross-sectional view illustrating a lens configuration of an imaging lens of Example 3 of the present invention.
Figure 11:
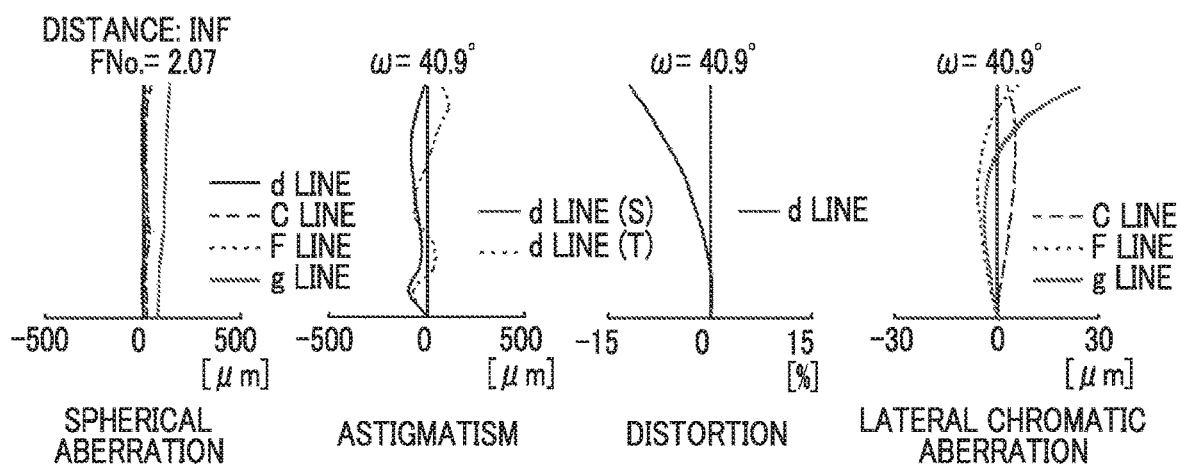
FIG. 11 is a diagram of aberrations of the imaging lens of Example 3 of the present invention.

Next, an imaging lens of Example 3 will be described. FIG. 3 is a cross-sectional view illustrating a lens configuration of the imaging lens of Example 3. The group configuration of the imaging lens of Example 3 is the same as the imaging lens of Example 1. Further, Table 7 shows basic lens data of the imaging lens of Example 3, Table 8 shows data about specification, and Table 9 shows data about aspheric surface coefficients. FIG. 11 shows aberration diagrams thereof.

TABLE 7

Example 3・Lens Data (n and ν are based on d line)

| Surface Number | Radius of Curvature | Surface Distance | n | ν |
|---|---|---|---|---|
| 1 | 62.50342 | 1.000 | 1.51299 | 65.69 |
| 2 | 11.49413 | 5.941 | | |
| *3 | 99.99100 | 2.700 | 1.51680 | 64.20 |
| *4 | −1389.25233 | 3.500 | | |
| 5 | −74.06658 | 1.510 | 1.64769 | 33.79 |
| 6 | 14.67807 | 4.277 | 1.88300 | 39.22 |
| 7 | −35.13863 | 4.870 | | |
| 8 (Stop) | ∞ | 3.000 | | |
| *9 | −22.12474 | 2.200 | 1.90270 | 31.00 |
| *10 | −55.55281 | 0.258 | | |
| 11 | ∞ | 4.948 | 1.69680 | 55.53 |
| 12 | −11.26472 | 0.820 | 1.58144 | 40.75 |
| 13 | 32.84965 | 5.040 | 1.77250 | 49.60 |
| 14 | −15.85999 | 4.147 | | |
| 15 | −100.00001 | 0.540 | 1.74000 | 28.30 |
| 16 | 33.22344 | 5.000 | | |
| 17 | 52.72759 | 2.100 | 1.61800 | 63.33 |
| 18 | ∞ | 11.020 | | |
| 19 | ∞ | 2.850 | 1.51680 | 64.20 |
| 20 | ∞ | 1.002 | | |

TABLE 8

Example 3・Specification (d Line)

| | |
|---|---|
| f | 18.588 |
| Bf | 13.90 |
| FNo. | 2.07 |
| 2ω [°] | 84.2 |

TABLE 9

Example 3・Aspheric surface coefficient

| Surface Number | 3 | 4 | 9 | 10 |
|---|---|---|---|---|
| KA | 1.0000000E+00 | 1.0000000E+00 | 1.0000000E+00 | 1.0000000E+00 |
| A3 | 7.7300378E−04 | −1.8359454E−05 | 2.5097885E−05 | 3.5069803E−04 |
| A4 | −7.2295090E−04 | 4.8038339E−05 | 2.5701990E−04 | 6.6583550E−05 |
| A5 | 4.7902748E−04 | 5.9677393E−06 | −8.6417181E−05 | 5.8705351E−06 |
| A6 | −2.3512334E−04 | −8.4202945E−06 | 3.8565573E−05 | 3.8295096E−05 |
| A7 | 8.5796401E−05 | 2.4065237E−06 | −3.2098647E−06 | −1.0196699E−05 |
| A8 | −2.1703166E−05 | −3.6827828E−07 | −2.8911666E−06 | −2.5991662E−06 |
| A9 | 3.4588742E−06 | 4.5209022E−07 | 6.5107628E−07 | 1.2402944E−06 |
| A10 | −2.9517025E−07 | −4.2040518E−09 | 1.0886069E−07 | 5.5424160E−08 |
| A11 | 8.2418753E−09 | 8.3677679E−11 | −4.7619602E−08 | −7.6211985E−08 |
| A12 | −4.7675643E−10 | −3.7883575E−11 | −7.5044432E−10 | 2.8373743E−09 |
| A13 | 2.5014909E−10 | 9.0332641E−12 | 1.9037019E−09 | 2.6407122E−09 |
| A14 | −2.5034710E−11 | 9.4318896E−13 | −9.5259692E−11 | −2.0920502E−10 |
| A15 | −3.0010624E−13 | −2.3456068E−13 | −4.0330521E−11 | −5.2981175E−11 |
| A16 | 1.6921631E−13 | 2.9627946E−15 | 2.3665181E−12 | 5.5909004E−12 |
| A17 | −8.4889752E−15 | 5.0721896E−17 | 4.7236667E−13 | 5.6133338E−13 |
| A18 | 1.0993931E−16 | 1.6446245E−16 | 4.6736680E−14 | −6.8998305E−14 |
| A19 | | −1.0336468E−17 | −1.9598345E−14 | −2.5522730E−15 |
| A20 | | | 1.1750661E−15 | 3.4271631E−16 |

Figure 4:
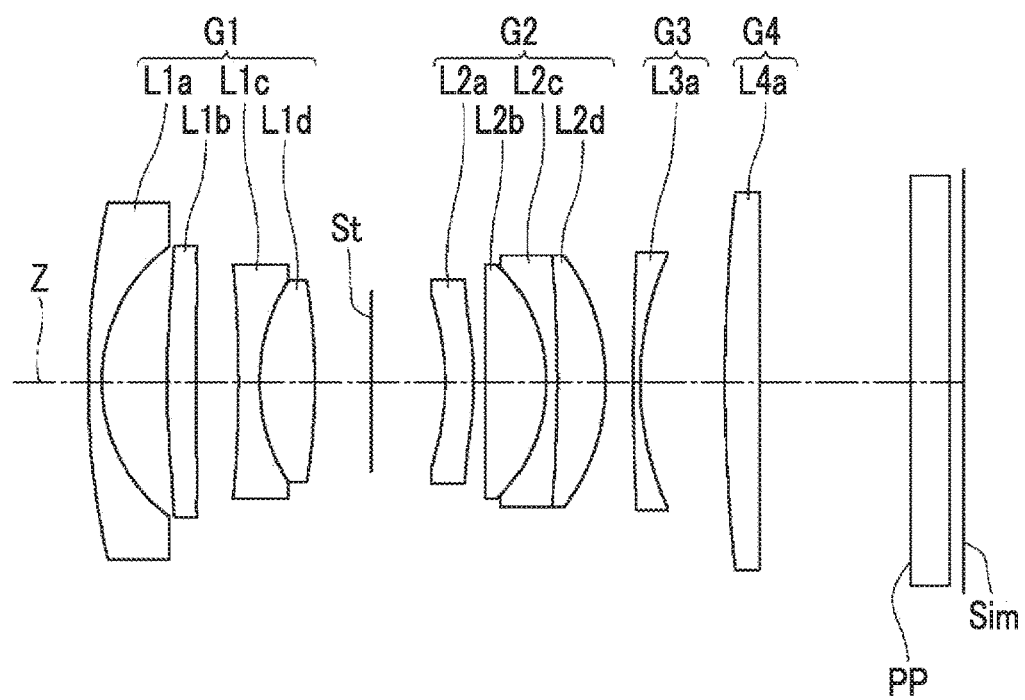
FIG. 4 is a cross-sectional view illustrating a lens configuration of an imaging lens of Example 4 of the present invention.
Figure 12:
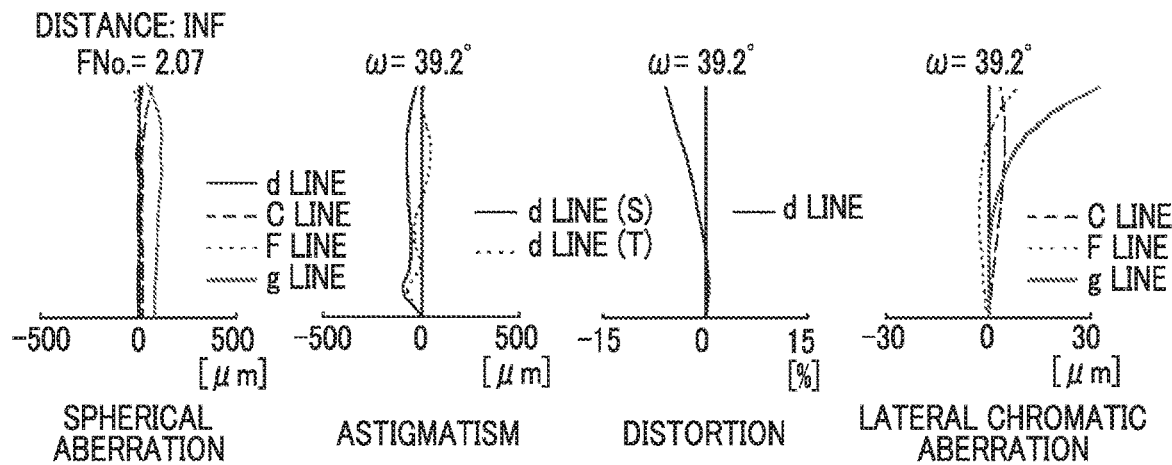
FIG. 12 is a diagram of aberrations of the imaging lens of Example 4 of the present invention.

Next, an imaging lens of Example 4 will be described. FIG. 4 is a cross-sectional view illustrating a lens configuration of the imaging lens of Example 4. The group configuration of the imaging lens of Example 4 is the same as the imaging lens of Example 1. Further, Table 10 shows basic lens data of the imaging lens of Example 4, Table 11 shows data about specification, and Table 12 shows data about aspheric surface coefficients. FIG. 12 shows aberration diagrams thereof.

TABLE 10

Example 4•Lens Data (n and ν are based on d line)

| Surface Number | Radius of Curvature | Surface Distance | n | ν |
|---|---|---|---|---|
| 1 | 55.42471 | 1.000 | 1.59989 | 63.47 |
| 2 | 11.49413 | 4.780 | | |
| *3 | 93.17708 | 2.100 | 1.51680 | 64.20 |
| *4 | 1000.68471 | 3.100 | | |
| 5 | −74.78320 | 1.510 | 1.61752 | 33.82 |
| 6 | 12.95945 | 4.000 | 1.88300 | 39.22 |
| 7 | −41.66577 | 4.100 | | |
| 8 (Stop) | ∞ | 5.400 | | |
| *9 | −16.00289 | 2.085 | 1.84887 | 40.12 |
| *10 | −19.36242 | 0.797 | | |
| 11 | ∞ | 4.417 | 1.72935 | 55.03 |
| 12 | −11.20607 | 0.780 | 1.70001 | 30.00 |
| 13 | −103.67252 | 3.500 | 1.83481 | 42.74 |
| 14 | −14.22663 | 2.000 | | |
| 15 | 147.60498 | 0.540 | 1.69895 | 30.13 |
| 16 | 20.45482 | 6.148 | | |

TABLE 10-continued

Example 4•Lens Data (n and ν are based on d line)

| Surface Number | Radius of Curvature | Surface Distance | n | ν |
|---|---|---|---|---|
| 17 | 118.18665 | 2.500 | 1.51680 | 64.20 |
| 18 | ∞ | 11.012 | | |
| 19 | ∞ | 2.850 | 1.51680 | 64.20 |
| 20 | ∞ | 1.003 | | |

TABLE 11

Example 4•Specification (d Line)

| | |
|---|---|
| f | 18.483 |
| Bf | 13.89 |
| FNo. | 2.07 |
| 2ω [°] | 80.4 |

TABLE 12

Example 4•Aspheric surface coefficient

| | Surface Number | | | |
|---|---|---|---|---|
| | 3 | 4 | 9 | 10 |
| KA | 1.0000000E+00 | 1.0000000E+00 | 1.0000000E+00 | 1.0000000E+00 |
| A3 | 8.2174202E−04 | −5.2686881E−19 | 2.5097885E−05 | 3.5069803E−04 |
| A4 | −9.2161559E−04 | −2.3260504E−04 | 1.1218493E−04 | 9.2599229E−06 |
| A5 | 5.1042582E−04 | 2.2113295E−04 | −4.6760138E−05 | 1.8871826E−05 |
| A6 | −1.2519104E−04 | −7.2523698E−05 | 3.6031913E−05 | 3.8051408E−05 |
| A7 | 2.1931080E−06 | 4.4137755E−06 | −4.1413550E−06 | −9.9827729E−06 |
| A8 | 5.4196751E−06 | 3.1106724E−06 | −2.7810216E−06 | −2.5784723E−06 |
| A9 | −8.4148016E−07 | −6.4844546E−07 | 6.8381498E−07 | 1.2392265E−06 |
| A10 | −6.5655265E−08 | −2.8208521E−08 | 1.1076964E−07 | 5.4863502E−08 |
| A11 | 2.4948952E−08 | 1.8918889E−08 | −4.8176202E−08 | −7.6241831E−08 |
| A12 | −5.8216699E−10 | −7.7178543E−10 | −9.0156038E−10 | 2.8349191E−09 |
| A13 | −3.0871239E−10 | −2.4276274E−10 | 1.8860139E−09 | 2.6411259E−09 |
| A14 | 1.9774094E−11 | 1.9636955E−11 | −9.6055485E−11 | −2.0925451E−10 |
| A15 | 1.7121618E−12 | 1.3827422E−12 | −4.0214853E−11 | −5.2977436E−11 |
| A16 | −1.5725514E−13 | −1.5701375E−13 | 2.5143886E−12 | 5.5946976E−12 |
| A17 | −3.3126918E−15 | −2.5363047E−15 | 5.1199341E−13 | 5.6269985E−13 |
| A18 | 4.0595835E−16 | 4.1450056E−16 | 5.5881798E−14 | −6.8949394E−14 |
| A19 | | 0.0000000E+00 | −2.4768068E−14 | −2.6493877E−15 |
| A20 | | | 1.5911345E−15 | 3.5100822E−16 |

Figure 5:
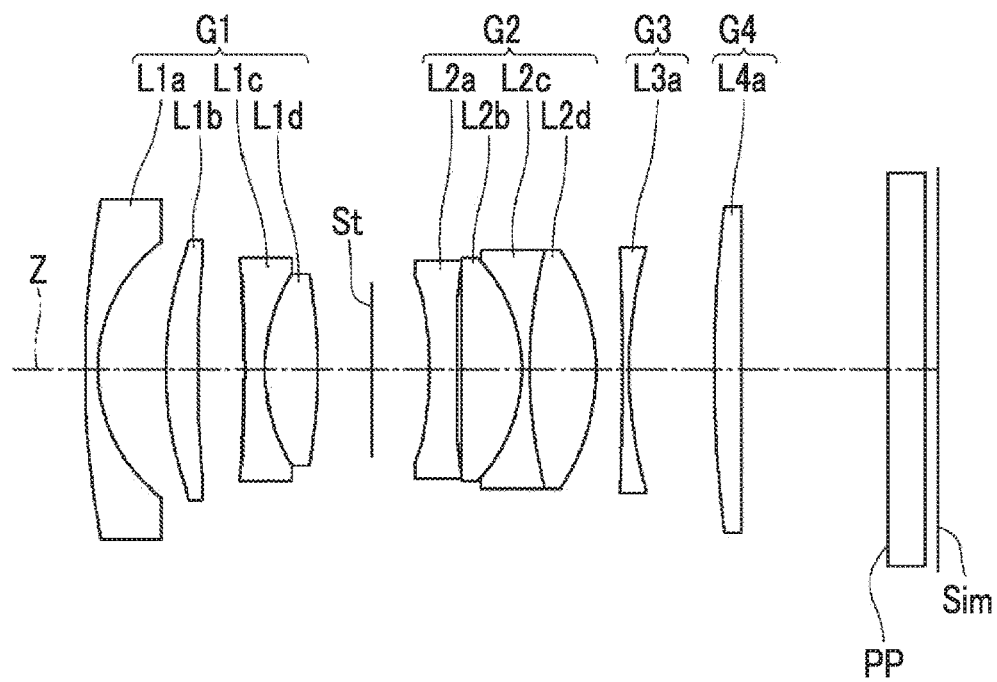
FIG. 5 is a cross-sectional view illustrating a lens configuration of an imaging lens of Example 5 of the present invention.
Figure 13:
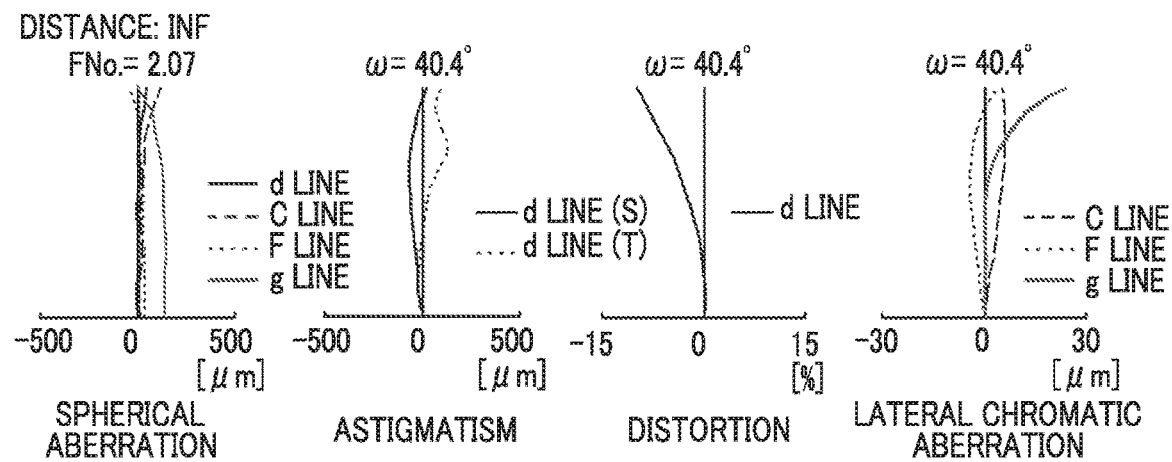
FIG. 13 is a diagram of aberrations of the imaging lens of Example 5 of the present invention.

Next, an imaging lens of Example 5 will be described. FIG. 5 is a cross-sectional view illustrating a lens configuration of the imaging lens of Example 5. The group configuration of the imaging lens of Example 5 is the same as the imaging lens of Example 1. Further, Table 13 shows basic lens data of the imaging lens of Example 5, Table 14 shows data about specification, and Table 15 shows data about aspheric surface coefficients. FIG. 13 shows aberration diagrams thereof.

TABLE 13

Example 5•Lens Data (n and ν are based on d line)

| Surface Number | Radius of Curvature | Surface Distance | n | ν |
|---|---|---|---|---|
| 1 | 62.49743 | 1.000 | 1.71174 | 52.91 |
| 2 | 11.49424 | 5.180 | | |
| *3 | 26.54448 | 2.456 | 1.51680 | 64.20 |
| *4 | 94.26170 | 3.500 | | |
| 5 | −108.93185 | 1.510 | 1.61708 | 33.87 |
| 6 | 13.29261 | 4.000 | 1.88300 | 39.22 |
| 7 | −40.04275 | 4.100 | | |
| 8 (Stop) | ∞ | 4.435 | | |
| *9 | −22.88672 | 2.085 | 1.73077 | 40.50 |
| *10 | −100.00000 | 0.400 | | |
| 11 | ∞ | 4.553 | 1.75449 | 53.31 |
| 12 | −11.62822 | 0.620 | 1.60818 | 37.18 |
| 13 | 33.88938 | 5.000 | 1.78654 | 49.35 |
| 14 | −15.31297 | 2.000 | | |
| 15 | −199.97329 | 0.540 | 1.77513 | 26.24 |
| 16 | 31.48223 | 6.475 | | |
| 17 | 90.02046 | 2.100 | 1.61800 | 63.33 |
| 18 | ∞ | 11.003 | | |
| 19 | ∞ | 2.850 | 1.51680 | 64.20 |
| 20 | ∞ | 1.001 | | |

TABLE 14

Example 5•Specification (d Line)

| | |
|---|---|
| f | 18.539 |
| Bf | 13.88 |
| FNo. | 2.07 |
| 2ω [°] | 83.0 |

TABLE 15

Example 5•Aspheric surface coefficient

| | Surface Number | | | |
|---|---|---|---|---|
| | 3 | 4 | 9 | 10 |
| KA | 1.0000000E+00 | 1.0000000E+00 | 1.0000000E+00 | 1.0000000E+00 |
| A3 | 5.3606594E−04 | −7.9030322E−19 | 2.5097885E−05 | 3.5069803E−04 |
| A4 | −5.6078921E−04 | −1.6356097E−04 | 1.4335917E−04 | 7.1671745E−05 |
| A5 | 3.3774648E−04 | 1.6522255E−04 | −5.7605432E−05 | 1.5195903E−05 |
| A6 | −1.0276433E−04 | −6.0963226E−05 | 3.5275058E−05 | 3.5704519E−05 |
| A7 | 1.0550517E−05 | 6.1380484E−06 | −4.3310680E−06 | −1.0265706E−05 |
| A8 | 2.5595755E−06 | 2.1244755E−06 | −2.8340339E−06 | −2.5834907E−06 |
| A9 | −7.9875431E−07 | −5.7362891E−07 | 6.7894204E−07 | 1.2422874E−06 |
| A10 | 2.4728005E−08 | −7.0545237E−09 | 1.1128504E−07 | 5.5504231E−08 |
| A11 | 1.5511262E−08 | 1.5103084E−08 | −4.7933642E−08 | −7.6173560E−08 |
| A12 | −1.6566863E−09 | −8.2829577E−10 | −8.5059900E−10 | 2.8367934E−09 |
| A13 | −9.5003171E−11 | −1.8599761E−10 | 1.8931647E−09 | 2.6403771E−09 |
| A14 | 2.0935820E−11 | 1.6747148E−11 | −9.5353809E−11 | −2.0945280E−10 |
| A15 | −2.3901723E−13 | 1.0712189E−12 | −4.0205855E−11 | −5.3015453E−11 |
| A16 | −8.9681366E−14 | −1.2737397E−13 | 2.4208992E−12 | 5.5905349E−12 |
| A17 | 3.1883731E−15 | −2.1977196E−15 | 4.8740687E−13 | 5.6230981E−13 |
| A18 | 4.3179666E−17 | 3.4252315E−16 | 4.8803040E−14 | −6.8796588E−14 |
| A19 | | 0.0000000E+00 | −2.1080645E−14 | −2.5677751E−15 |
| A20 | | | 1.2929467E−15 | 3.4125530E−16 |

Figure 6:
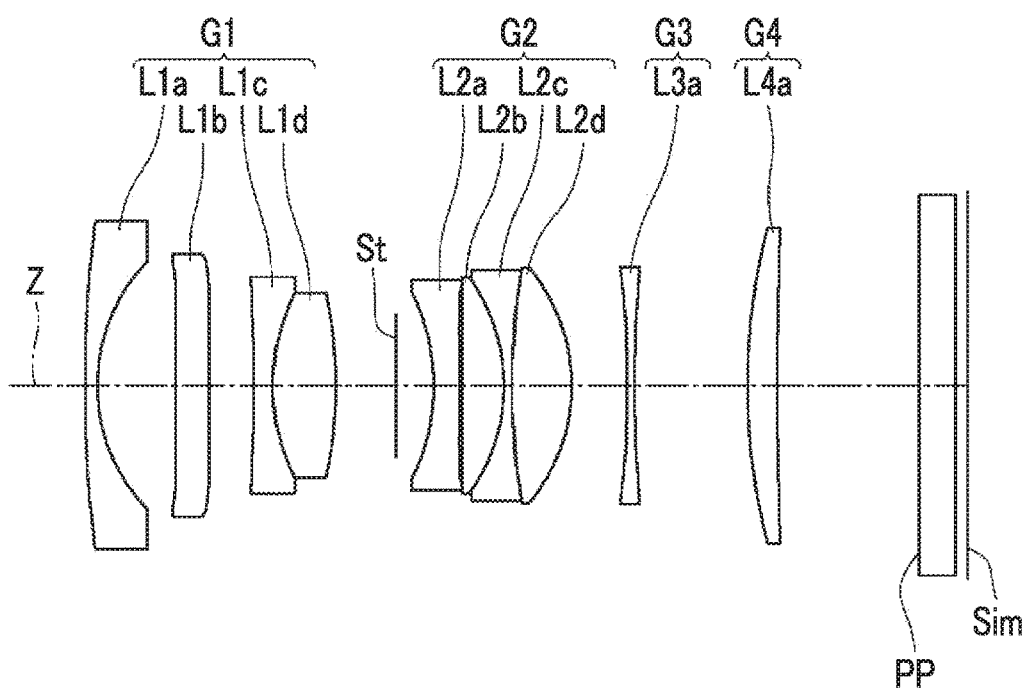
FIG. 6 is a cross-sectional view illustrating a lens configuration of an imaging lens of Example 6 of the present invention.
Figure 14:
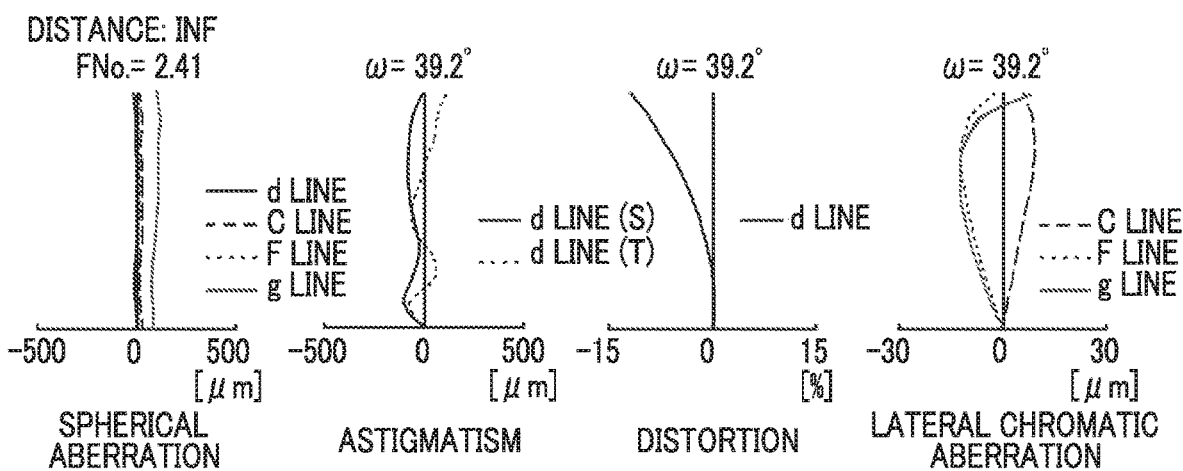
FIG. 14 is a diagram of aberrations of the imaging lens of Example 6 of the present invention.

Next, an imaging lens of Example 6 will be described. FIG. 6 is a cross-sectional view illustrating a lens configuration of the imaging lens of Example 6. The group configuration of the imaging lens of Example 6 is the same as the imaging lens of Example 1. Further, Table 16 shows basic lens data of the imaging lens of Example 6, Table 17 shows data about specification, and Table 18 shows data about aspheric surface coefficients. FIG. 14 shows aberration diagrams thereof.

TABLE 16

Example 6•Lens Data (n and ν are based on d line)

| Surface Number | Radius of Curvature | Surface Distance | n | ν |
|---|---|---|---|---|
| 1 | 90.90973 | 1.000 | 1.52001 | 65.53 |
| 2 | 13.06874 | 6.180 | | |
| *3 | 499.81563 | 2.700 | 1.51680 | 64.20 |
| *4 | −696.53325 | 3.500 | | |
| 5 | −164.13825 | 1.510 | 1.64769 | 33.79 |
| 6 | 15.09837 | 4.987 | 1.88300 | 39.22 |
| 7 | −31.67425 | 4.764 | | |
| 8 (Stop) | ∞ | 3.000 | | |
| *9 | −14.09474 | 2.085 | 1.90270 | 31.00 |
| *10 | −62.13755 | 0.146 | | |
| 11 | ∞ | 3.326 | 1.69680 | 55.53 |
| 12 | −13.54028 | 0.620 | 1.58144 | 40.75 |
| 13 | 55.54296 | 4.615 | 1.77250 | 49.60 |
| 14 | −13.73764 | 4.442 | | |
| 15 | −71.42398 | 0.540 | 1.74000 | 28.30 |
| 16 | 96.74591 | 8.970 | | |
| 17 | 46.52944 | 2.400 | 1.61800 | 63.33 |
| 18 | 499.93533 | 11.149 | | |
| 19 | ∞ | 2.850 | 1.51680 | 64.20 |
| 20 | ∞ | 1.003 | | |

TABLE 17

Example 6•Specification (d Line)

| | |
|---|---|
| f | 19.701 |
| Bf | 14.03 |
| FNo. | 2.41 |
| 2ω [°] | 81.0 |

TABLE 18

Example 6•Aspheric surface coefficient

| | Surface Number | | | |
|---|---|---|---|---|
| | 3 | 4 | 9 | 10 |
| KA  | 1.0000000E+00  | 1.0000000E+00  | 1.0000000E+00  | 1.0000000E+00 |
| A3  | 7.2587391E-04  | 0.0000000E+00  | 2.5097885E-05  | 3.5069803E-04 |
| A4  | -6.5383815E-04 | -2.1162146E-05 | 3.1024871E-04  | 9.7318891E-05 |
| A5  | 3.2210469E-04  | 5.9237633E-05  | -9.0497954E-05 | 8.3579223E-07 |
| A6  | -8.4832763E-05 | -2.9523893E-05 | 3.4785939E-05  | 3.7140023E-05 |
| A7  | 7.8868936E-06  | 5.4782331E-06  | -2.9541070E-06 | -1.0284337E-05 |
| A8  | 1.6521319E-06  | 2.3676731E-07  | -2.8268852E-06 | -2.5921854E-06 |
| A9  | -5.4869273E-07 | -2.5820094E-07 | 6.5043239E-07  | 1.2428621E-06 |
| A10 | 3.7154653E-08  | 3.0514338E-08  | 1.0752534E-07  | 5.5700502E-08 |
| A11 | 7.2811294E-09  | 2.4324978E-09  | -4.7850328E-08 | -7.6201919E-08 |
| A12 | -1.4596936E-09 | -8.4715155E-10 | -7.5047572E-10 | 2.8323988E-09 |
| A13 | 3.4619902E-11  | 4.1379927E-11  | 1.9095988E-09  | 2.6397442E-09 |
| A14 | 1.3531937E-11  | 7.1367844E-12  | -9.4465978E-11 | -2.0928279E-10 |
| A15 | -1.2297482E-12 | -9.0017291E-13 | -4.0324786E-11 | -5.2972223E-11 |
| A16 | -1.4231022E-14 | 1.5667580E-15  | 2.3699230E-12  | 5.5926870E-12 |
| A17 | 6.1448417E-15  | 4.5185527E-15  | 4.7071204E-13  | 5.6179780E-13 |
| A18 | -2.1923280E-16 | -1.9304191E-16 | 4.6207513E-14  | -6.9039557E-14 |
| A19 |                | 0.0000000E+00  | -1.9641439E-14 | -2.5566473E-15 |
| A20 |                |                | 1.1879499E-15  | 3.4290344E-16 |

Figure 7:
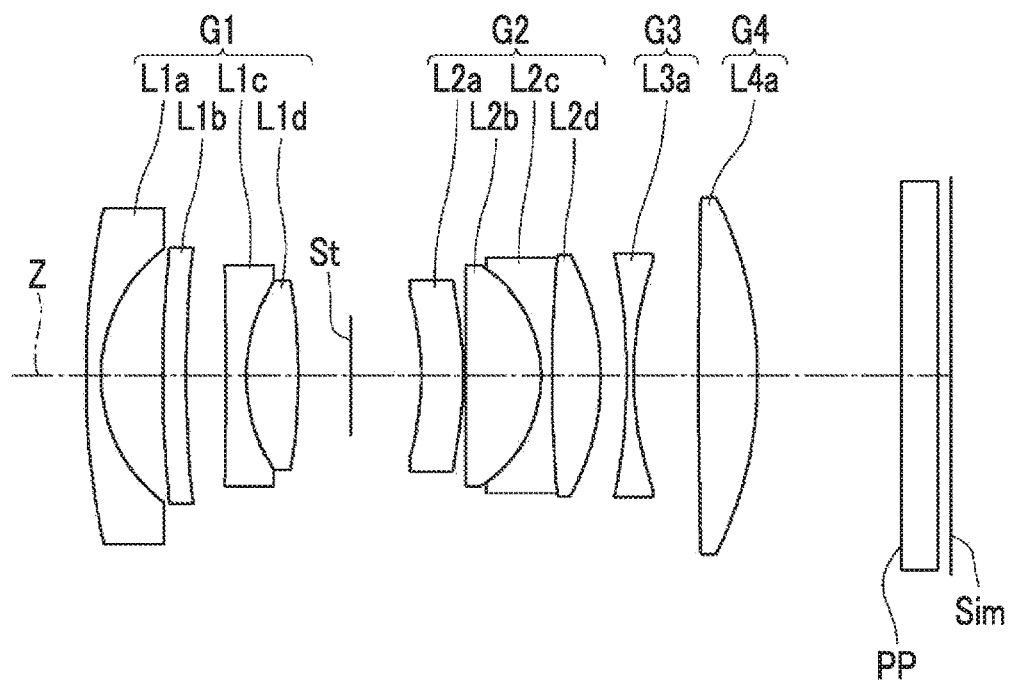
FIG. 7 is a cross-sectional view illustrating a lens configuration of an imaging lens of Example 7 of the present invention.
Figure 15:
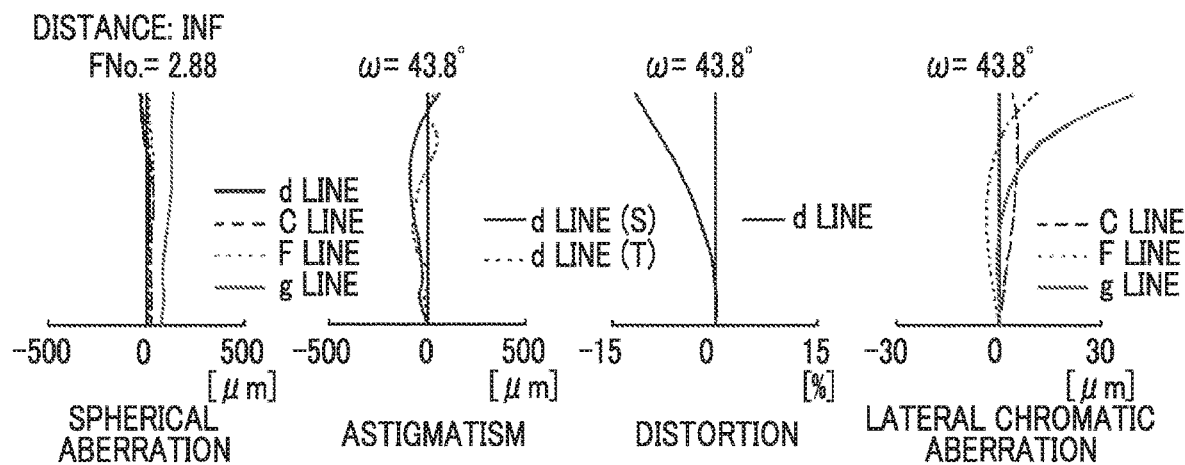
FIG. 15 is a diagram of aberrations of the imaging lens of Example 7 of the present invention.

Next, an imaging lens of Example 7 will be described. FIG. 7 is a cross-sectional view illustrating a lens configuration of the imaging lens of Example 7. The group configuration of the imaging lens of Example 7 is the same as the imaging lens of Example 1. Further, Table 19 shows basic lens data of the imaging lens of Example 7, Table 20 shows data about specification, and Table 21 shows data about aspheric surface coefficients. FIG. 15 shows aberration diagrams thereof.

TABLE 19

Example 7•Lens Data (n and ν are based on d line)

| Surface Number | Radius of Curvature | Surface Distance | n | ν |
|---|---|---|---|---|
| 1  | 55.74586  | 1.200 | 1.72986 | 57.66 |
| 2  | 11.49413  | 4.780 |         |       |
| *3 | 90.70235  | 1.800 | 1.51680 | 64.20 |
| *4 | 85.26901  | 3.100 |         |       |
| 5  | -250.05626| 1.510 | 1.62581 | 32.94 |
| 6  | 12.73259  | 4.000 | 1.88300 | 39.22 |
| 7  | -39.30293 | 4.100 |         |       |
| 8 (Stop) | ∞   | 5.400 |         |       |
| *9 | -21.43119 | 3.300 | 1.84887 | 40.12 |
| *10| -22.12012 | 0.200 |         |       |
| 11 | ∞         | 5.812 | 1.74341 | 53.66 |
| 12 | -9.49327  | 0.780 | 1.63835 | 34.40 |
| 13 | 82.54151  | 3.820 | 1.83481 | 42.74 |
| 14 | -17.90546 | 2.000 |         |       |
| 15 | -42.43015 | 0.540 | 1.69895 | 30.13 |
| 16 | 24.55340  | 5.000 |         |       |
| 17 | 397.01230 | 4.628 | 1.51680 | 64.20 |
| 18 | -28.73855 | 11.009|         |       |
| 19 | ∞         | 2.850 | 1.51680 | 64.20 |
| 20 | ∞         | 1.003 |         |       |

TABLE 20

Example 7•Specification (d Line)

| | |
|---|---|
| f    | 16.764 |
| Bf   | 13.89 |
| FNo. | 2.88 |
| 2ω [°] | 90.0 |

TABLE 21

Example 7•Aspheric surface coefficient

| | Surface Number | | | |
|---|---|---|---|---|
| | 3 | 4 | 9 | 10 |
| KA  | 1.0000000E+00  | 1.0000000E+00  | 1.0000000E+00  | 1.0000000E+00 |
| A3  | 9.4314232E-04  | -4.7418193E-19 | 2.5097885E-05  | 3.5069803E-04 |
| A4  | -1.0866734E-03 | -2.6083510E-04 | 3.7192302E-05  | -9.7348675E-05 |
| A5  | 5.8286992E-04  | 2.3732681E-04  | -5.8673701E-05 | 9.9865623E-06 |
| A6  | -1.3844323E-04 | -7.8096152E-05 | 3.4826099E-05  | 3.9555831E-05 |
| A7  | 4.7811380E-07  | 4.6630734E-06  | -3.6453196E-06 | -1.0116189E-05 |
| A8  | 6.4585381E-06  | 3.3973858E-06  | -2.6327059E-06 | -2.6086249E-06 |
| A9  | -9.1052661E-07 | -6.9343430E-07 | 6.6716658E-07  | 1.2382931E-06 |
| A10 | -9.2432120E-08 | -3.3906170E-08 | 1.0734243E-07  | 5.5635157E-08 |
| A11 | 2.8893888E-08  | 2.0471110E-08  | -4.8492306E-08 | -7.5779769E-08 |
| A12 | -3.1502665E-10 | -7.3622776E-10 | -9.4753935E-10 | 2.8068296E-09 |
| A13 | -3.8181914E-10 | -2.6781455E-10 | 1.8977330E-09  | 2.6351799E-09 |

TABLE 21-continued

Example 7・Aspheric surface coefficient

| | Surface Number | | | |
|---|---|---|---|---|
| | 3 | 4 | 9 | 10 |
| A14 | 1.9908161E−11 | 2.0003916E−11 | −9.0219305E−11 | −2.1020853E−10 |
| A15 | 2.3184860E−12 | 1.5809712E−12 | −3.9883829E−11 | −5.3032672E−11 |
| A16 | −1.7669813E−13 | −1.6319822E−13 | 2.5205905E−12 | 5.6155232E−12 |
| A17 | −5.2199826E−15 | −3.1563694E−15 | 4.9232261E−13 | 5.6465242E−13 |
| A18 | 4.9830984E−16 | 4.3785858E−16 | 5.3923941E−14 | −6.8541145E−14 |
| A19 | | 0.0000000E+00 | −2.5590872E−14 | −2.6186903E−15 |
| A20 | | | 1.7491022E−15 | 3.3571850E−16 |

Figure 8:
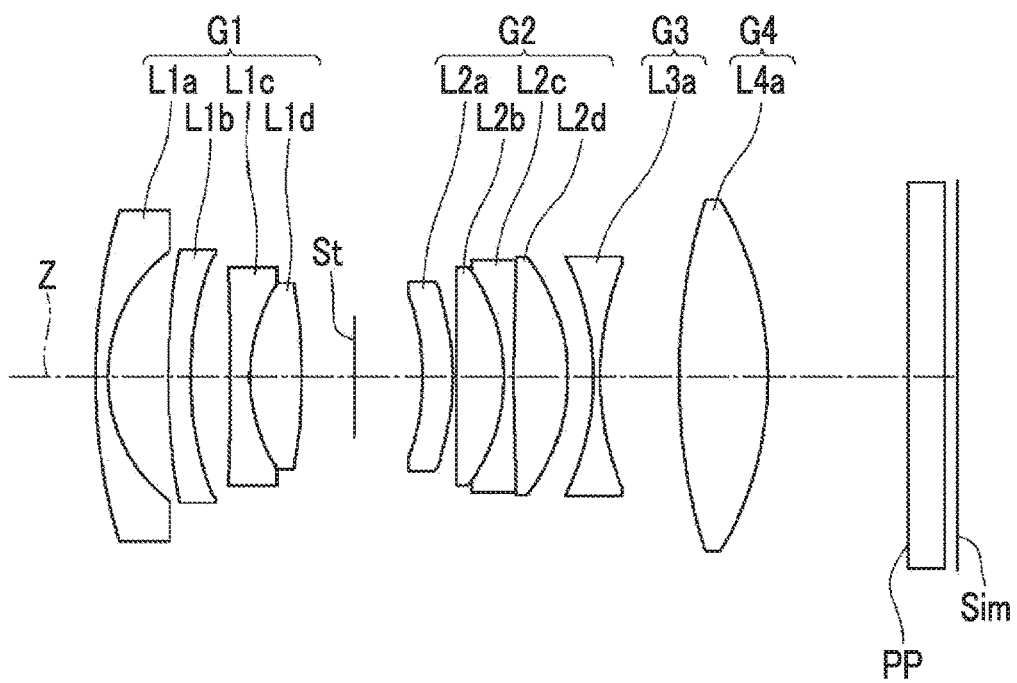
FIG. 8 is a cross-sectional view illustrating a lens configuration of an imaging lens of Example 8 of the present invention.
Figure 16:
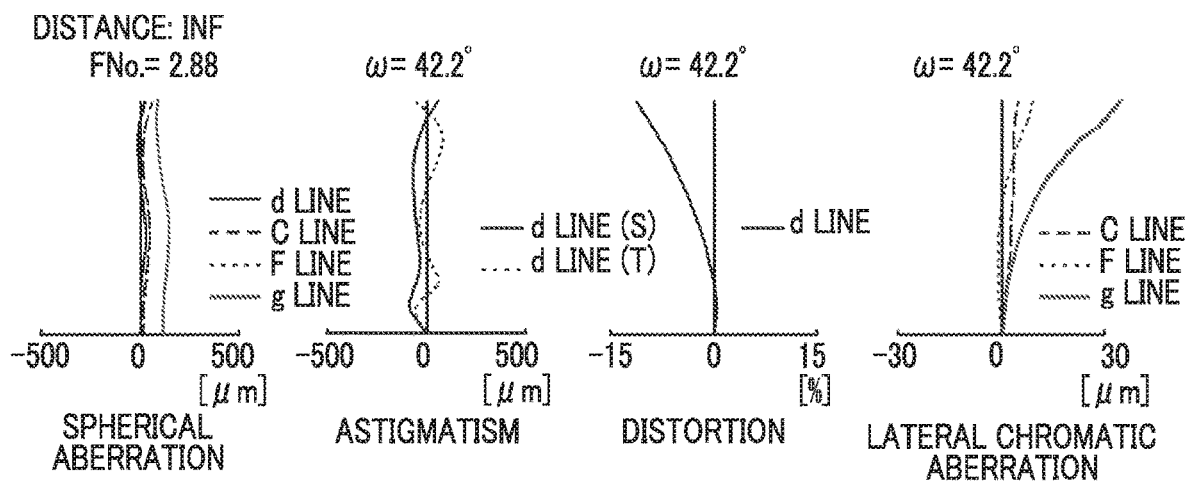
FIG. 16 is a diagram of aberrations of the imaging lens of Example 8 of the present invention.

Next, an imaging lens of Example 8 will be described. FIG. 8 is a cross-sectional view illustrating a lens configuration of the imaging lens of Example 8. The group configuration of the imaging lens of Example 8 is the same as the imaging lens of Example 1. Further, Table 22 shows basic lens data of the imaging lens of Example 8, Table 23 shows data about specification, and Table 24 shows data about aspheric surface coefficients. FIG. 16 shows aberration diagrams thereof.

TABLE 22

Example 8・Lens Data (n and ν are based on d line)

| Surface Number | Radius of Curvature | Surface Distance | n | ν |
|---|---|---|---|---|
| 1 | 41.75472 | 1.000 | 1.66045 | 61.04 |
| 2 | 11.49413 | 4.780 | | |
| *3 | 48.60231 | 1.800 | 1.51680 | 64.20 |
| *4 | 24.94617 | 3.100 | | |
| 5 | −250.05626 | 1.510 | 1.61789 | 33.79 |
| 6 | 12.61780 | 4.000 | 1.88300 | 39.22 |
| 7 | −39.45585 | 4.100 | | |
| 8 (Stop) | ∞ | 5.400 | | |
| *9 | −18.94761 | 2.385 | 1.84887 | 40.12 |
| *10 | −17.07701 | 0.299 | | |
| 11 | ∞ | 3.719 | 1.76797 | 51.20 |
| 12 | −13.34343 | 0.780 | 1.68661 | 30.96 |
| 13 | 207.84852 | 4.197 | 1.83481 | 42.74 |
| 14 | −14.20708 | 2.000 | | |
| 15 | −19.37055 | 0.540 | 1.69895 | 30.13 |
| 16 | 21.32206 | 6.193 | | |
| 17 | 43.34796 | 7.000 | 1.51680 | 64.20 |
| 18 | −25.29351 | 10.997 | | |
| 19 | ∞ | 2.850 | 1.51680 | 64.20 |
| 20 | ∞ | 1.003 | | |

TABLE 23

Example 8・Specification (d Line)

| f | 17.643 |
|---|---|
| Bf | 13.88 |
| FNo. | 2.88 |
| 2ω [°] | 86.8 |

TABLE 24

Example 8・Aspheric surface coefficient

| | Surface Number | | | |
|---|---|---|---|---|
| | 3 | 4 | 9 | 10 |
| KA | 1.0000000E+00 | 1.0000000E+00 | 1.0000000E+00 | 1.0000000E+00 |
| A3 | 1.0899781E−03 | 4.2149505E−19 | 2.5097885E−05 | 3.5069803E−04 |
| A4 | −1.1601299E−03 | −2.1182120E−04 | −6.5961159E−05 | −1.5345587E−04 |
| A5 | 5.7891615E−04 | 2.1444745E−04 | −4.9731256E−05 | 9.5793978E−06 |
| A6 | −1.3169746E−04 | −8.2732757E−05 | 3.3966323E−05 | 3.9655057E−05 |
| A7 | −6.5020957E−07 | 7.6242828E−06 | −3.7526359E−06 | −1.0122189E−05 |
| A8 | 6.2744704E−06 | 3.4310339E−06 | −2.6205682E−06 | −2.5925373E−06 |
| A9 | −8.3613733E−07 | −8.4568197E−07 | 6.6596069E−07 | 1.2399406E−06 |
| A10 | −9.3154238E−08 | −2.5905853E−08 | 1.0781955E−07 | 5.5757464E−08 |
| A11 | 2.6899297E−08 | 2.4594626E−08 | −4.8717592E−08 | −7.5909048E−08 |
| A12 | −1.8691629E−10 | −1.0866469E−09 | −8.5452712E−10 | 2.8102038E−09 |
| A13 | −3.5461471E−10 | −3.2952405E−10 | 1.9054152E−09 | 2.6373576E−09 |
| A14 | 1.7380701E−11 | 2.6499804E−11 | −9.3298676E−11 | −2.1099670E−10 |
| A15 | 2.1322335E−12 | 2.0638111E−12 | −3.9897542E−11 | −5.2962674E−11 |
| A16 | −1.5579344E−13 | −2.2110109E−13 | 2.4632314E−12 | 5.6190469E−12 |
| A17 | −4.7119918E−15 | −4.6992785E−15 | 4.9122455E−13 | 5.6554107E−13 |
| A18 | 4.3339024E−16 | 6.4115039E−16 | 5.1773981E−14 | −6.8327638E−14 |
| A19 | | 0.0000000E+00 | −2.3771754E−14 | −2.6464290E−15 |
| A20 | | | 1.5623062E−15 | 3.3112372E−16 |

Table 25 shows values corresponding to Conditional Expressions (1) to (9) of the imaging lenses of Examples 1 to 8. It should be noted that, in the above-mentioned examples, the d line is set as the reference wavelength, and the values shown in Table 25 are values at the reference wavelength.

TABLE 25

| Expression Number | Conditional Expression | Example 1 | Example 2 | Example 3 | Example 4 |
|---|---|---|---|---|---|
| (1) | f1/Ra1 | −1.528 | −3.439 | −1.630 | −1.919 |
| (2) | GS1/GS2 | 1.494 | 1.123 | 1.463 | 1.213 |
| (3) | f/f4 | 0.265 | 0.097 | 0.218 | 0.081 |
| (4) | vdiff2 | 14.78 | 25.36 | 14.78 | 25.03 |
| (5) | f2/Ra2 | −1.153 | −1.059 | −1.259 | −1.191 |
| (6) | f/f1 | 0.355 | 0.118 | 0.325 | 0.231 |
| (7) | f/f3 | −0.623 | −0.606 | −0.553 | −0.543 |
| (8) | f/f12 | 1.512 | 1.646 | 1.398 | 1.556 |
| (9) | Bf/f | 0.845 | 0.840 | 0.748 | 0.752 |

| Expression Number | Conditional Expression | Example 5 | Example 6 | Example 7 | Example 8 |
|---|---|---|---|---|---|
| (1) | f1/Ra1 | −1.211 | −1.253 | −2.442 | −3.839 |
| (2) | GS1/GS2 | 1.272 | 1.787 | 1.061 | 1.209 |
| (3) | f/f4 | 0.127 | 0.238 | 0.322 | 0.551 |
| (4) | vdiff2 | 16.13 | 14.78 | 21.37 | 21.37 |
| (5) | f2/Ra2 | −1.222 | −1.947 | −0.878 | −0.957 |
| (6) | f/f1 | 0.382 | 0.497 | 0.175 | 0.116 |
| (7) | f/f3 | −0.529 | −0.355 | −0.756 | −1.222 |
| (8) | f/f12 | 1.495 | 1.225 | 1.627 | 1.927 |
| (9) | Bf/f | 0.749 | 0.712 | 0.829 | 0.787 |

As can be seen from the above-mentioned data, all the imaging lenses of Examples 1 to 8 satisfy Conditional Expressions (1) and (9), and are imaging lenses each of which has a small size and each of which is a wide-angle imaging lens having a total angle of view of 70° or more.

Figure 17:
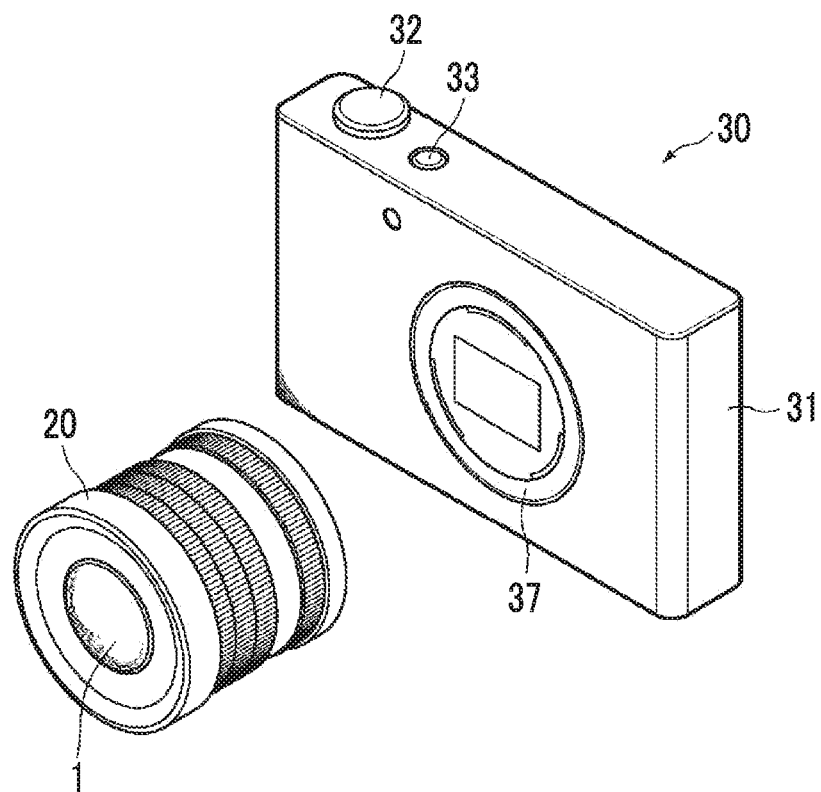
FIG. 17 is a perspective view illustrating the front side of an imaging apparatus according to an embodiment of the present invention.
Figure 18:
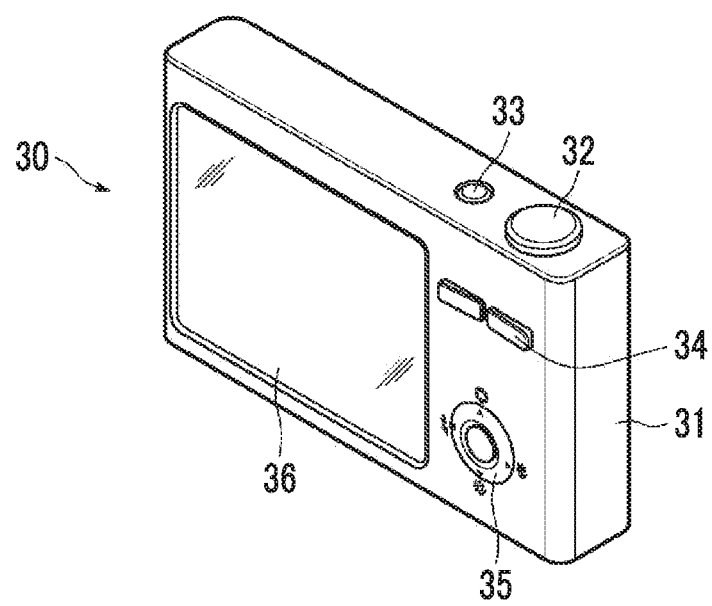
FIG. 18 is a perspective view illustrating the rear side of the imaging apparatus of FIG. 17.

Next, an embodiment of the imaging apparatus according to the present invention will be described with reference to FIGS. 17 and 18. In FIGS. 17 and 18, a camera 30, which is obliquely viewed respectively on the front side and the rear side, is a non-reflex (so-called mirrorless) type digital camera on which an interchangeable lens 20 housing the imaging lens 1 according to the above-mentioned embodiment of the present invention in a lens barrel is detachably mounted.

The camera 30 comprises a camera body 31, and a shutter button 32 and a power button 33 are provided on an upper surface thereof. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element (not shown in the drawing), a signal processing circuit, a recording medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the examples, and different values may be used therefor.

In the above-mentioned embodiment of the imaging apparatus, the non-reflex type digital camera is taken as an example and described with the drawings. However, the imaging apparatus of the present invention is not limited to this. For example, the present invention may be applied to imaging apparatuses such as video cameras, digital cameras which are not the non-reflex type, movie imaging cameras, broadcast cameras.

EXPLANATION OF REFERENCES

1: imaging lens
20: interchangeable lens
30: camera
31: camera body
32: shutter button
33: power button
34, 35: operation section
36: display section
37: mount
G1: first lens group
G2: second lens group
G3: third lens group
G4: fourth lens group
L1a to L4a: lens
PP: optical member
Sim: image plane
St: aperture stop
a: on-axis rays
b: rays with maximum angle of view
Z: optical axis

What is claimed is:

1. An imaging lens consisting of, in order from an object side:
   a first lens group that has a positive refractive power;
   a stop;
   a second lens group that has a refractive power;
   a third lens group that has a negative refractive power; and
   a fourth lens group that has a positive refractive power,
   wherein the first lens group has, successively in order from a position closest to the object side, a negative meniscus lens that is convex toward the object side, a lens that is convex toward the object side, and a lens that is concave toward the object side,
   wherein the third lens group consists of a negative lens,
   wherein during focusing from an object at infinity to an object at a shortest distance, only the third lens group moves to an image side along an optical axis, and
   wherein assuming that
   a focal length of the first lens group is f1, and
   a radius of curvature of an image side surface of a lens closest to the image side in the first lens group is Ra1,
   Conditional Expression (1) is satisfied, $$-9 < f1/Ra1 < -0.2 \quad (1).$$

2. The imaging lens according to claim 1,
wherein assuming that
a distance on the optical axis from an object side surface of a lens closest to the object side in the first lens group to the stop is GS1, and
a distance from the stop to an image side surface of a lens closest to the image side in the second lens group is GS2,
Conditional Expression (2) is satisfied, $$0.8<GS1/GS2<2.1 \qquad (2).$$

3. The imaging lens according to claim 2,
wherein Conditional Expression (2-1) is satisfied, $$1<GS1/GS2<1.9 \qquad (2\text{-}1).$$

4. The imaging lens according to claim 1,
wherein the first lens group has a cemented lens which is formed by cementing a negative lens and a positive lens in order from the object side.

5. The imaging lens according to claim 1,
wherein the second lens group has a lens that is concave toward the object side, at a position closest to the object side.

6. The imaging lens according to claim 1,
wherein the second lens group has a cemented lens which is formed by cementing at least one negative lens and at least one positive lens.

7. The imaging lens according to claim 1,
wherein assuming that
a focal length of the whole system during focusing on the object at infinity is f, and
a focal length of the fourth lens group is f4,
Conditional Expression (3) is satisfied, $$0.05<f/f4<0.7 \qquad (3).$$

8. The imaging lens according to claim 1,
wherein the second lens group has a cemented lens which is formed by cementing at least one negative lens and at least one positive lens, and
wherein assuming that a difference in Abbe number between a maximum of Abbe numbers of positive lenses composing the cemented lens and a minimum of Abbe numbers of negative lenses composing the cemented lens is vdiff2,
Conditional Expression (4) is satisfied, $$10<vdiff2 \qquad (4).$$

9. The imaging lens according to claim 1,
wherein assuming that
a focal length of the second lens group is f2, and
a radius of curvature of an image side surface of a lens closest to the image side in the second lens group is Ra2,
Conditional Expression (5) is satisfied, $$-4<f2/Ra2<-0.5 \qquad (5).$$

10. The imaging lens according to claim 9,
wherein Conditional Expression (5-1) is satisfied, $$-2.5<f2/Ra2<-0.8 \qquad (5\text{-}1).$$

11. The imaging lens according to claim 1,
wherein assuming that
a focal length of the whole system during focusing on the object at infinity is f,
Conditional Expression (6) is satisfied, $$0.05<f/f1<0.7 \qquad (6).$$

12. The imaging lens according to claim 11,
wherein Conditional Expression (6-1) is satisfied, $$0.1<f/f1<0.6 \qquad (6\text{-}1).$$

13. The imaging lens according to claim 1,
wherein assuming that
a focal length of the whole system during focusing on the object at infinity is f, and
a focal length of the third lens group is f3,
Conditional Expression (7) is satisfied, $$-1.5<f/f3<-0.1 \qquad (7).$$

14. The imaging lens according to claim 13,
wherein Conditional Expression (7-1) is satisfied, $$-1.3<f/f3<-0.2 \qquad (7\text{-}1).$$

15. The imaging lens according to claim 1,
wherein assuming that
a focal length of the whole system during focusing on the object at infinity is f, and
a composite focal length of the first lens group and the second lens group is f12,
Conditional Expression (8) is satisfied, $$1<f/f12<2.5 \qquad (8).$$

16. The imaging lens according to claim 1,
wherein the second lens group has, in order from the object side, an aspheric lens, and a three-piece cemented lens which is formed by cementing three lenses, and
wherein the three-piece cemented lens consists of two positive lenses and one negative lens.

17. The imaging lens according to claim 1,
wherein the fourth lens group consists of a positive lens.

18. The imaging lens according to claim 1,
wherein assuming that
a back focal length based on an air conversion length is Bf, and
a focal length of the whole system during focusing on the object at infinity is f,
Conditional Expression (9) is satisfied, $$0.5<Bf/f<1.1 \qquad (9).$$

19. The imaging lens according to claim 1,
wherein Conditional Expression (1-1) is satisfied, $$-5<f1/Ra1<-0.5 \qquad (1\text{-}1).$$

20. An imaging apparatus comprising the imaging lens according to claim 1.

* * * * *